C. L. DREISSLEIN.
Machines for Mining Coal.

No. 136,712.                                Patented March 11, 1873.

Witnesses.                                  Inventor:

UNITED STATES PATENT OFFICE.

CHARLES L. DRIESSLEIN, OF CHICAGO, ILLINOIS.

IMPROVEMENT IN MACHINES FOR MINING COAL.

Specification forming part of Letters Patent No. 136,712, dated March 11, 1873.

*To all whom it may concern:*

Be it known that I, CHARLES L. DRIESSLEIN, of Chicago, in the county of Cook and State of Illinois, have invented certain new and useful Improvements in Machines for Mining Coal, Quarrying or Channeling Stone, and other similar purposes; and that the following is a full, clear, and exact description of the same, reference being had to the accompany drawing making a part of this specification, in which—

Figure 1:
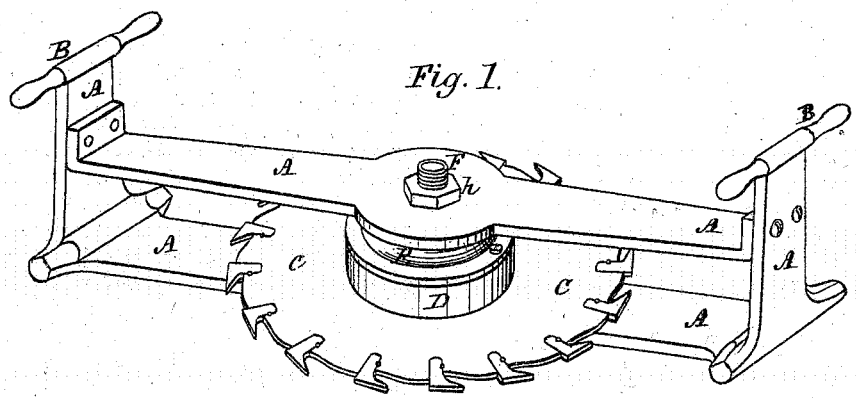
Figure 2:
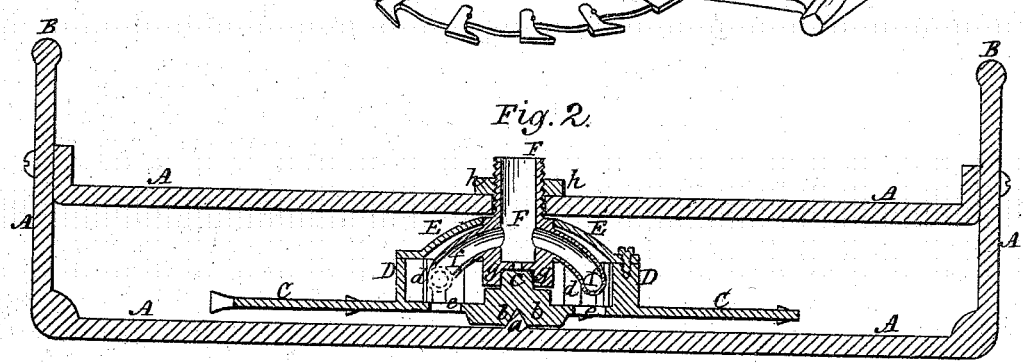
Figure 3:
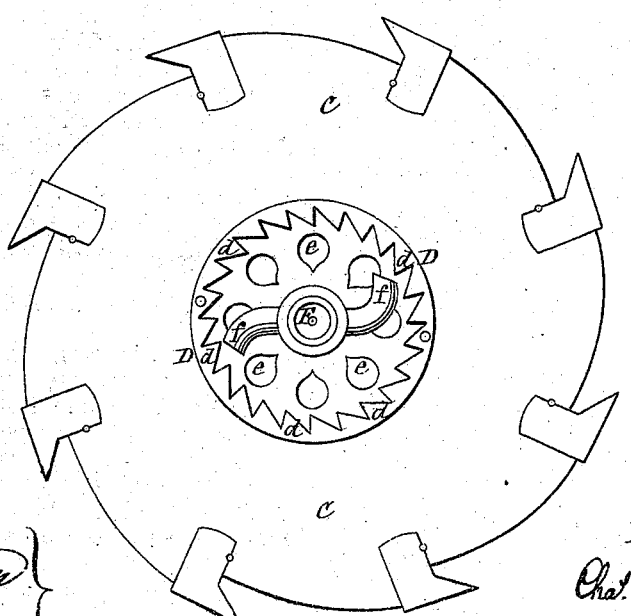

Figure 1 represents a perspective view of the machine. Fig. 2 represents a longitudinal vertical section through the same. Fig. 3 represents a plan of the saw and the devices through or by means of which, in connection with water or compressed air, it is driven.

My invention consists in a machine wherein a rotating saw or toothed disk is driven by the force of water or compressed air introduced and applied directly to the saw or disk through suitable avenues or appliances, thus making a simple, cheap, and available channeling-machine, portable and occupying very small space.

To enable others skilled in the art to make and use my invention, I will proceed to describe the same with reference to the drawing.

A represents a portable frame, with handles B, by which it can be easily moved and controlled. In this frame is hung a saw, C, as also certain appliances through or by means of which this saw may be driven by either the power of water or force of compressed air. On the base of the frame A there is a bearing, $a$, on or against which the saw is supported and runs, there being a corresponding recess in the hub $b$ of the saw to take in said bearing. The hub $b$, as seen in Fig. 2, projects on both sides of the saw, and has opposite to the bearing $a$ another bearing, $c$, upon which two bearings the saw is supported and rotated. Upon the upper side of the saw there is a drum or case, D, in the inner perimeter of which is formed a series of buckets, $d$. The top of the drum is fitted with a tight cap or dome, E, and the saw-plate at the bottom of this inclosed drum or case is furnished with a series of openings, $e$. Through the dome or cap E is passed a pipe, F, which, underneath said dome or within the case or drum, branches off into two curved pipes, $ff$, the orifices or outlets of which are opposite the buckets $d$, and turned in or toward the direction in which the saw is to run. The lower end of the pipe F is closed, except a small hole left for the water to pass through when the water is used as a lubricator. The end of the pipe is formed into a step, $g$, for receiving the bearing $c$ of the saw.

A screw-thread is cut on the exterior of the pipe F, and by means of a nut, $h$, working thereon, above the top or upper piece of the frame, this pipe and the bearing at $g c$ may be regulated and adjusted.

The teeth of the saw I prefer to make of the form as shown in the drawing, and removable and replaceable.

The hose or pipe through which water or compressed air is introduced to drive the saw is screwed onto the pipe F, and this pipe and its branches $ff$ are held stationary in the main frame while the saw and its case and buckets revolve by the direct action of the water or compressed air against said buckets.

The saw could be revolved by attaching the curved arms to the saw, so that the force would be used or applied as a reactionary power; but the direct action of the power would be more forcible. When run on the reactionary principle the buckets need not be used.

It may also be found desirable in using this mining or channeling machine to place it on a bed-piece or track, and by means of cogged, screw, or other well-known gearing attached thereto, or to the frame of the saw, or to both, to press forward and hold the saw to its work instead of controlling its cut simply by hand. And though I have only mentioned coal and rock as the substances to be wrought upon by the saw, it is obvious that any and all other mineral or earthy substance may be cut or channeled thereby.

Having thus fully described my invention, what I claim is—

In a machine for mining coal or for quarrying or channeling rock, fire-clay, or other similar substances, the combination of a directly-attached saw and driving-wheel, with the inlet and exit passages or pipes for the water or compressed air that drives them, and the bearings for sustaining them, substantially as and for the purpose described and represented.

CHAS. L. DRIESSLEIN.

Witnesses:
 JAMES GOGGIN,
 W. WENDELL.